Oct. 29, 1963     A. V. WEASLER     3,108,457
UNIVERSALLY JOINTED SHAFT WITH INTEGRAL
SHOCK ABSORBING COUPLING
Filed June 29, 1961
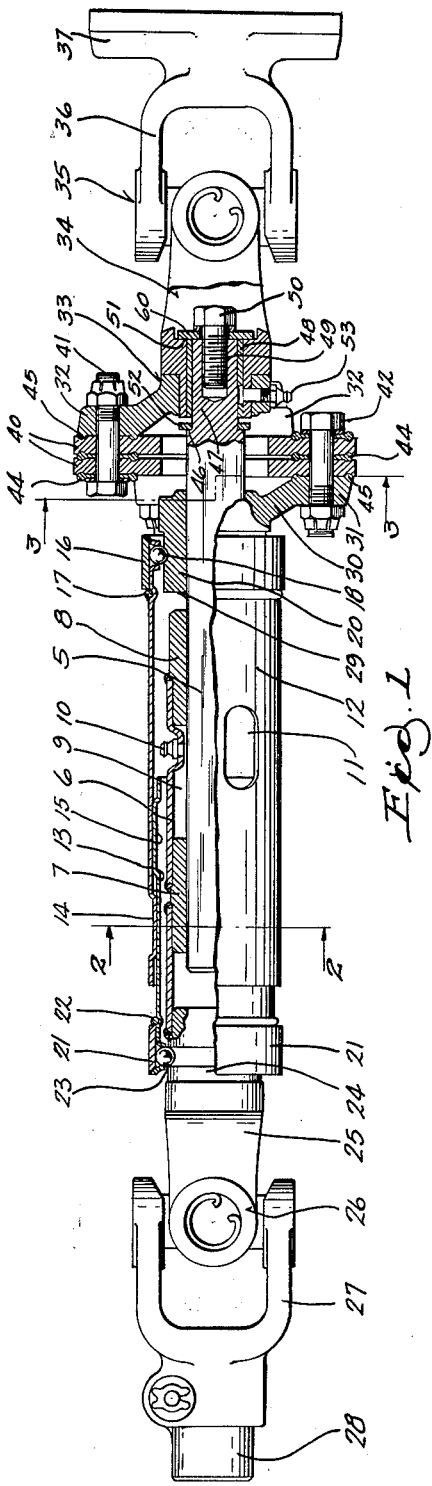
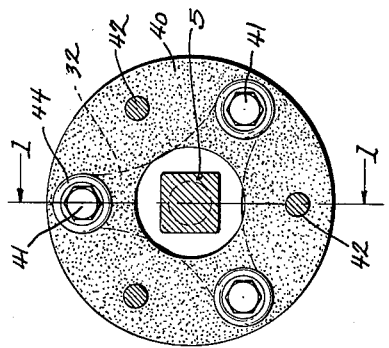
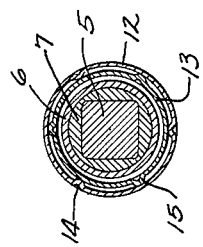
INVENTOR.
ANTHONY V. WEASLER
BY
Wheeler, Wheeler & Wheeler
ATTORNEYS

United States Patent Office 3,108,457
Patented Oct. 29, 1963

3,108,457
UNIVERSALLY JOINTED SHAFT WITH INTEGRAL SHOCK ABSORBING COUPLING
Anthony V. Weasler, 603 Ridge Road, West Bend, Wis.
Filed June 29, 1961, Ser. No. 120,555
4 Claims. (Cl. 64—23)

This invention relates to a universally jointed and telescopically extensible shaft with integral shock absorbing torsional coupling protected against axial thrust.

Telescopic shafts with two universal joints are widely used. It is desirable to incorporate a shock absorbing coupling of the type in which spiders with peripherally staggered legs drive through flexible annuli of steel or fabric-reinforced rubber or the like. However, while such a shock absorbing drive protects the universal joints and the driving and driven parts under certain conditions of use, considerable damage has been done under circumstances such that the shock absorbing coupling is subjected to axial as well as torsional thrust.

The present invention seeks to provide a shock absorbing coupling in an extensible shaft equipped with universal joints and it provides protection against damage to the coupling and to the driving and driven parts by an arrangement in which driving and driven parts of the coupling have telescopically engaged piloting means provided with thrust washers which preclude appreciable axial displacement in either direction, thus limiting the exposure of the shock absorbing coupling to torque thrust only.

In the drawings:

FIG. 1 is a view in side elevation of a universal jointed telescopic shaft equipped with a shock absorbing coupling in accordance with this invention, portions of the shaft and the coupling being broken away in axial section to the plane indicated at 1—1 in FIG. 3.

FIG. 2 is a detail view in cross section on the line 2—2 of FIG. 1.

FIG. 3 is a detail view taken in section on the line 3—3 of FIG. 1.

The telescopic shaft comprises an inner shaft element 5 of non-circular cross section, the preferred section being square as shown in FIG. 2. Cooperating therewith is a tubular outer tube shaft element 6 which may comprise sleeves joined to the bushing members 7 and 8 which are axially spaced to provide a grease reservoir 9 in accordance with my companion application Serial No. 103,831, filed April 18, 1961. A grease fitting 10 accessible through opening 11 in the outer guard tube 12 facilitates replenishment of grease in the reservoir 9.

The outer guard tube 12 is telescopically associated with an inner guard tube 13. While I have other spacing means, in the particular embodiment shown the outer guard tube has inwardly depressed ribs 14 and the inner guard tube 13 has outwardly expressed ribs 15, the ribs providing means for spacing the guard tubes as shown in FIG. 2. The outer race 16 anchored on the outer guard tube 12 by means of a spring snap ring 17 holds in position the bearing balls 18 which ride on the grooved periphery of the hub 20 upon the shock absorbing coupling element hereinafter to be described. Similarly, an outer race 21 anchored by snap ring 22 about the end of the inner guard tube 15 confines the bearing ball 23 upon the annularly grooved hub 24 to which the outer shaft element 6 is mounted as shown in FIG. 1. The hub 24 is part of the element 25 of the universal joint 26. The companion joint element 27 has its hub portion 28 constituting a shaft portion of a shaft not shown. A somewhat comparable race arrangement is disclosed in my Patent 2,911,803.

The hub 20 of the shock absorbing coupling is welded at 29 to the inner shaft element 5. It carries a spider 30 which has arms 31 peripherally staggered with respect to the arms 32. Spider 33 is fixed to the hub of universal joint element 34 of universal joint 35. The other element 36 of joint 35 has a coupling or other similar connection at 37.

The shock absorbing connection between spiders 30 and 33 is provided by flexible disks or resiliently yieldable annuli 40. Extending through the annuli and in threaded connection with each of the arms 31, 32 of the respective spiders 30 and 33 are bolts 41 and 42 respectively. Each bolt is encircled by peripherally ribbed washers 44, the ribs being embedded in the annuli 40 under the compression of the bolts 41 and 42. The respective spider arms 31 and 32 have like ribs at 45 which correspond in radius to the ribs of the washers.

The squared inner shaft 5 has a shoulder at 46 beyond which the shaft has a shaft extension 47 of cylindrical cross section. The shaft extension 47 is piloted within a bushing 48 in the hub 34 of universal joint 35.

Many different fastening devices are available for use at the end of extension 47 to anchor the hub on the extension. In the arrangement shown, threaded socket 49 in the shaft extension 47 receives a cap screw 50 which anchors a thrust washer 60 to the end of the shaft, the thrust washer being disposed in the universal joint hub 34 in abutment with the shoulder 51 of such hub. Thrust washer 52 abuts the shoulder 46 of shaft element 5 and is of sufficient radius to engage the end of the hub 34 in the event of any substantial axial displacement of the hub respecting the shaft element. Since the hub 34 is fixed to spider 33 and the shaft 5 is fixed to spider 30 of the coupling, it will be evident that the described arrangement for precluding axial movement between shaft 5 and hub 34 will also preclude axial movement between the two spiders. Hence the coupling annuli are relieved of axial thrust.

A grease fitting is desirably provided at 53 for supplying lubricant to bushing 48 and thereby lubricating the bearing between this bushing and the reduced extension 47 of the inner telescopic shaft element 5.

The arrangement is one in which ample provision is made by the two universals 26 and 35 for accommodating misalignment of driving and driven shafts. The drive will normally be from left to right as viewed in FIG. 1 but either end may be the driving end.

Particularly in agricultural machinery, there is need for very substantial axial elongation and contraction of such a shaft. This is amply provided by the telescopic shaft sections 5 and 6. However, in such an installation, there is also need for a shock absorbing coupling such as that illustrated.

Regardless of the desirability of such a coupling, it cannot safely be used, particularly in many agricultural installations because, under high torque, so much friction is developed between the relatively movable inner and outer elements of the telescopic shaft as to subject the flexible coupling annuli 40 to destructive axial displacement with resulting damage not only to the annuli but to the driving and driven parts, and machines or machine components, connected through the shaft herein disclosed.

It has been found that the piloted thrust bearing is a complete answer, since it protects the annuli 40 against destructive axial displacement and requires all axial movement to occur between driving and driven telescopic parts 5 and 6 of the shaft. In the positions in which the parts are illustrated, the universal coupling element 34 is in engagement with the thrust washer 60, thereby transmitting axial thrust to the right directly to the inner telescopic shaft element 5 without axial displacement of the shock absorbing coupling annuli 40. Any movement of the universal joint member 34 to the left as viewed in FIG. 1 will release it from pressure engagement with thrust washer 60 and bring about its engagement with thrust washer 52. While a certain amount of axial clearance is intentionally provided, the amount is not enough to damage the shock absorbing annuli 40. These annuli, therefore, are substantially completely relieved of axial thrust and they transmit torque only.

I claim:

1. In a shaft comprising telescopic shaft elements having bearing means providing relative guidance between such elements for axial movement, the combination with respective elements, of driving and driven universal joints, means connecting one of said elements with one of said joints, and means connecting the other of said elements with the other of said joints and including a shock absorbing coupling interposed between said other element and said other joint.

2. In a shaft comprising shaft elements having bearing means providing relative guidance between such elements for axial movement, the combination with respective elements, of driving and driven universal joints, one of which is operatively connected to one of said elements, and means connecting the other of said elements with the other of said joints and including a shock absorbing coupling, and thrust bearing means for limiting axial displacement between the last mentioned element and the universal joint connected therewith through said coupling, whereby said coupling is substantially relieved of axial thrust and subjected to torque transmission only.

3. The combination set forth in claim 2 in which said thrust bearing means comprises parts having complementary pilot bearing means, one of said parts being an extension of the last mentioned shaft element and the other being an extension of the last mentioned joint, and a thrust washer engaged with one of said parts and for which the other part provides a complementary thrust bearing surface.

4. In a shaft the combination with inner and outer relatively extensible shaft elements having complementary bearing portions of non-circular cross section, of a spider connected with one of said elements, a first universal joint connected with the other, a second spider, a second universal joint in operative driving connection with the second spider, flexible annuli providing a torque transmitting shock absorbing coupling between the spiders, the spiders having arms connected with said annuli at angularly spaced points, and means for protecting said annuli against axial deflection, said means including an extension on the inner shaft element projecting beyond the spider mounted on said element and through the second spider, said extension being shouldered adjacent the second spider and having a cylindrical portion within the second spider, the second universal joint having a hub encircling the bearing portion and in which said extension is piloted, a thrust washer between the hub and said shoulder, a second thrust washer mounted at the end of said extension and abutting the hub in opposition to the thrust washer first mentioned, and means for fixing the second thrust washer to the end of said extension.

References Cited in the file of this patent

UNITED STATES PATENTS

| | | |
|---|---|---|
| 1,629,707 | Hudson | May 24, 1927 |
| 2,072,090 | Anderson | Mar. 2, 1937 |
| 2,271,741 | Mansfield | Feb. 3, 1942 |
| 2,659,244 | Guy | Nov. 17, 1953 |
| 2,953,000 | Ressler et al. | Sept. 20, 1960 |

FOREIGN PATENTS

| | | |
|---|---|---|
| 501,171 | Great Britain | Feb. 22, 1939 |
| 542,477 | Great Britain | Jan. 12, 1942 |